Dec. 26, 1961     A. FERRARI, JR     3,014,848

METHOD OF PERFORMING BIOLOGICAL ASSAYS

Filed March 7, 1958

INVENTOR.
Andres Ferrari, Jr
BY
ATTORNEYS

United States Patent Office 3,014,848
Patented Dec. 26, 1961

3,014,848
METHOD OF PERFORMING BIOLOGICAL ASSAYS
Andres Ferrari, Jr., Scarsdale, N.Y., assignor to Technicon Instruments Corporation, Chauncey, N.Y., a corporation of New York
Filed Mar. 7, 1958, Ser. No. 719,847
8 Claims. (Cl. 195—103.5)

This invention relates to the art of bacteriology and biology and more particularly to a method of performing biological assays.

The performance of biological assays in accordance with known methods is a tedious, complicated and lengthy procedure and requires the use and handling of a great deal of equipment, including various receptacles, test tubes, pipettes, etc. Moreover, said methods call for a high degree of care and accuracy of measurement in the performance of the assay in order to avoid or minimize errors which would otherwise result.

The primary object of the present invention is to enable biological assays to be performed by a method which is free from the above and other difficulties and sources of possible error inherent in the known methods.

Another object is to enable a series of biological assays to be performed by automatically operable apparatus, whereby to eliminate a great many of the operations which must be performed manually in the known biological assay methods.

A further object is to provide a method of performing biological assays in such manner that a multiplicity of operations can be performed quickly and accurately and the results automatically recorded while the assays are being performed.

The above and other objects, features and advantages of this invention will be fully understood from the following description considered in connection with the accompanying illustrative drawing.

Figure 1:
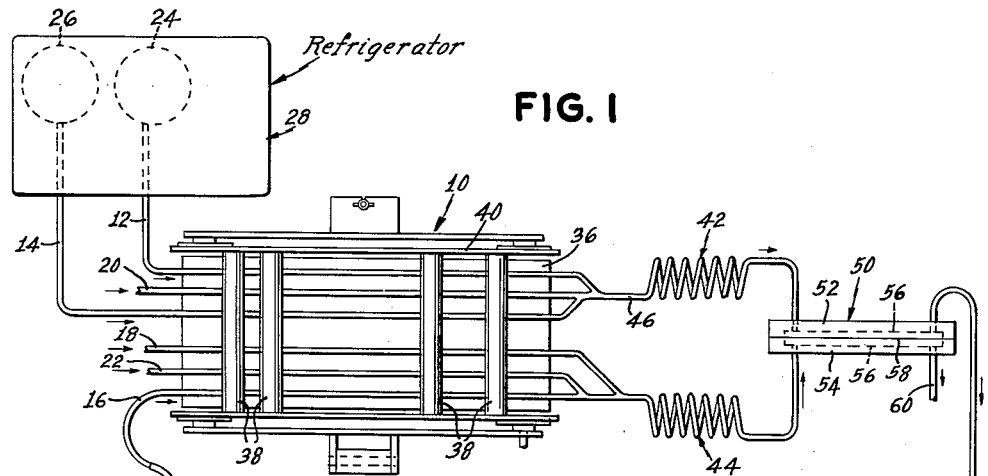
FIG. 1 is a more or less schematic view illustrative of the method and apparatus.

In accordance with one known biological assay method, there is employed, for a single assay, a series of test tubes containing a liquid nutrient medium, known as "broth," and a measured proportion of an inoculum i.e., bacteria or micro-organisms, in the different test tubes, respectively. To the inoculum-containing nutrient in each test tube is then added a carefully measured quantity of the inhibitor, for example, an anti-biotic material, or a sulpha drug, according to the assay or test being performed for the purpose of ascertaining the efficacy of the inhibitor in preventing the growth of the bacteria or micro-organisms in the nutrient, the proportion of inhibitor being different in the different test tubes, respectively. After a suitable incubation period, the contents of each test tube of inoculated nutrient treated with the inhibitor must be carefully examined and analyzed, usually by measuring the degree of turbidity of the liquid in the test tube. Similar operations may be performed in testing a substance, for example a vitamin preparation, in respect to its ability to enhance or promote the growth of various micro-organisms.

Pursuant to the present invention, according to the example which will now be explained with reference to the accompanying drawings, the apparatus for performing the method comprises a proportioning pump 10 which is operable to transmit the liquid nutrient, the inoculum, and the inhibitor or the enhancer, as the case may be, in predetermined relative proportions in the form of flowing streams, respectively, through tubular conduits 12, 14 and 16, respectively. Said pump is also operable to transmit a stream of a diluent, for example, water through tube 18, and streams of air or other inert gas through tubes 20 and 22, respectively. The liquid nutrient or broth and the inoculum are provided in the receptacles 24 and 26, respectively, kept in a refrigerator or cooler 28. It will be understood that tubes 12 and 14 extend from the receptacles 20 and 22 in the refrigerator to the proportioning pump 10. The inhibitor, for example, an antibiotic such as, without limitation, streptomycin, penicillin, etc. or some other substance which inhibits the growth of bacteria or micro-organisms employed in liquid form or in a liquid vehicle, is supplied, as here shown, by the rotary supply device 30. Said rotary supply device comprises a rotary plate 31 provided with a plurality of circumferentially spaced recesses 32 in which open top receptacles are removably held. A pick-up tube indicated at 34 is connected to the supply tube 16 and is pivotally moved into and out of the receptacles in recesses 32, respectively, in timed relation to the rotation of said supply device. The supply device 30 is preferably of the construction and operation described in the U.S. application of Jack Isreeli, Serial No. 666,403, filed June 18, 1957, and as described in said application, plate 31 is rotated intermittently about a vertical axis by a Geneva gear mechanism and the pick-up tube indicated at 34 is pivotally moved at the pivot 35 into and out of each receptacle by suitable mechanism in timed relation to the intermittent movement of rotary plate 31. The proportioning pump 10 is preferably of the type which comprises a plurality of resilient tubes whose lumens or internal diameters are of the correct size according to the desired flow rates of the fluids transmitted through said tubes, respectively, by the operation of the pump. More particularly, the above mentioned tubes 12, 14, 16, 18, 20 and 22 extend longitudinally in parallel relation over a platen 36 and a series of pressure rollers indicated at 38 are moved progressively along the lengths of said tubes by an endless belt conveyor 40 for progressively closing the tubes along their lengths and thereby transmitting the fluids through the tubes. A pump of this type is shown and described in U.S. Patent No. 2,893,324.

Figure 2:
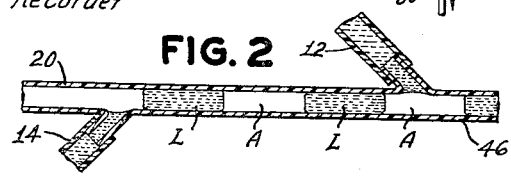
FIG. 2 is a fragmentary view of a tubular passage, illustrating the formation of liquid and air segments in the stream of fluid.

The apparatus also includes the mixing coils 42 and 44 which are preferably constituted by helical glass tubing of suitable longitudinal extent whereby a plurality of liquids which are supplied to the inlet end of the coil are thoroughly mixed with each other during the passage of said liquids therethrough. As here shown, the tubes 12 and 14 which supply the nutrient and the inoculum are connected to the inlet end of coil 42 whereby these liquids are thoroughly mixed during the passage thereof through the coil. Air which is supplied through the tube 20 during the operation of the pump divides the liquid stream composed of the liquids flowing through tubes 12 and 14 into spaced segments L of liquid separated by intervening segments A of air as illustrated in FIG. 2, so that the fluid stream which passes into the inlet end 46 of coil 42 and flows through said coil is constituted by a stream of spaced liquid segments with intervening segments of air. Tubes 16 and 18 through which the inhibitor and the diluent flow, are connected to the inlet end of mixing coil 44 so that said liquids are thoroughly mixed with each other during their passage through said coil. Also, as here shown, air is supplied through the tube 22 and serves to segmentize the fluid stream into alternate liquid and air segments as just described with reference to the liquids and air supplied by tubes 12, 14 and 20.

Figure 3:
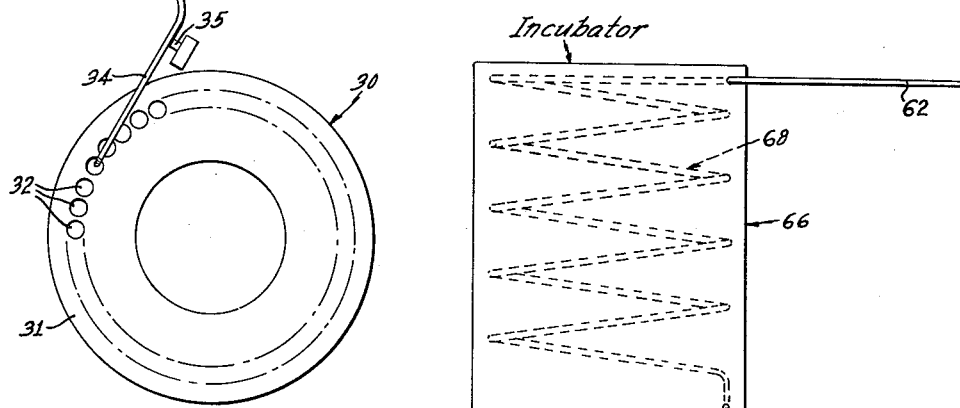
FIG. 3 is a plan view of the inner face of a grooved dialyzer plate of a dialyzer utilized in the practise of this invention.
Figure 3:
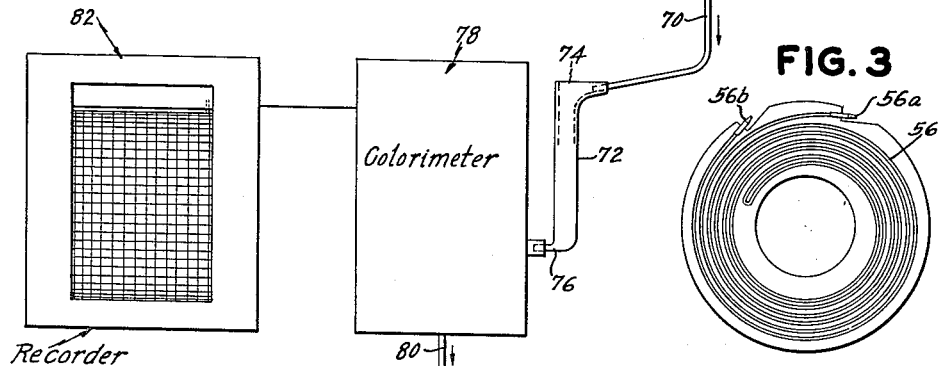

In accordance with the present invention, provision is made for diffusing the inhibitor into the inoculum-containing medium, namely into the liquid mixture of broth and inoculum flowing from the outlet of coil 42. Pursuant to this invention, the diffusion means comprises a dialyzer indicated at 50, which is preferably of the construction described in U.S. Patent No. 2,864,507. Said dialyzer comprises confronting companion plates 52 and 54 each having a spirally grooved surface as indicated at 56 in FIG. 3, which provides a continuous tubular channel between the inner surface of each plate and the confronting surface of the dialyzer membrane or diaphragm which is clamped between the two plates. The spiral grooves 56 in the plates 52 and 54, respectively, are mirror duplicates of each other, whereby the fluid which enters the dialyzer at one side of the membrane flows in the same direction as the fluid which enters the dialyzer at the other side of the membrane. It will be noted that the outlet ends of coils 42 and 44 are connected to the dialyzer at opposite sides, respectively of the membrane 58. In FIG. 3, the inlet and outlet ends of the grooves are indicated at 56a and 56b, respectively. It will be understood that the spiral groove in one of the plates registers with the spiral groove in the companion, so that as the liquids flow through the tubular passages defined by said grooves and the interposed membrane 58, the substance which is present in one of the fluid streams at one side of the membrane passes through the membrane and is diffused into the fluid stream at the other side of the membrane. More specifically, in the course of the flow of the fluids through the dialyzer at the opposite sides of the membrane some of the inhibitor containing liquid diffuses across the dialyzer membrane into the stream of liquid which comprises the inoculum and the nutrient and the rest of the inhibitor liquid is discharged to waste through the outlet indicated at 60 connected to the outlet end 56b of the dialyzer groove. The outlet 56b at the other side of the dialyzer membrane is connected by a tube 62 to an incubator 66 which is maintained at the required temperature in any suitable way. Said incubator may be of any suitable or well known type and is preferably in the form of a glass coil 68 of sufficient length according to the required period of incubation, the time required for the flow of the fluid stream through the incubator coil corresponding to the required incubation period. The outlet 70 of the incubator is connected to a blender, which is a tubular receptacle 72 provided with a vent opening at its upper end as indicated at 74, whereby the liquid in the segmented fluid stream which passes through the tubular coil 68 of the incubator is freed of the air segments and whereby the liquid segments are consolidated and blended during the flow thereof through receptacle 72. The outlet 76 at the lower part of receptacle 72 is connected to the cuvette or flow cell of the colorimeter 78 which is of the continuous flow type, the outlet of the flow cell being indicated at 80. A recorder 82 operable under the control of the colorimeter 78 provides a continuous record during the operation of the apparatus. It will be understood that the colorimeter is provided with a phototube which is responsive to light passing through the flow cell of the colorimeter and that an electrical system which may be of any suitable type is operable under the control of the phototube of the colorimeter to control the operation of the motor which actuates the recorder stylus. It may be noted that the recorder is preferably of the well known slide wire type and that the motor which operates the stylus in accordance with the signals derived from the phototube of the colorimeter is of the self-balancing type.

It view of the above description, it will be apparent that in accordance with the method of the present invention a stream of inoculated nutrient medium is formed automatically by operation of the pump 10 and that simultaneous with the formation of said stream, a stream of inhibitor is formed and is transmitted by said pump, and the inhibiting agent in said stream is diffused into the inoculated nutrient medium. The diffusion operation is accomplished, pursuant to the present invention, by flowing two liquid streams, namely, the stream containing inoculated nutrient medium and the stream containing the inhibiting agent through the dialyzer at opposite sides, respectively, of the dialyzer membrane. It will be understood that the quantity of the inhibiting agent which diffuses into the inoculated nutrient medium during the flow of the two streams through the dialyzer is proportional to the quantity of the inhibiting agent in the stream, and that it is unnecessary to perform any measuring operations in view of this proportionality in respect to the quantity of the inhibiting agent which is diffused into the inoculated nutrient medium. Further, in accordance with the present invention, the inhibiting agent in various concentrations may be supplied automatically through tube 16 for diffusion into the inoculated nutrient medium, by providing the inhibitor in different concentrations in a series of receptacles in the automatic supply device 30. It will be understood further that when the pick-up tube is raised out of one receptacle in the operation of the supply device, as described above, air is automatically drawn into said tube for passage through tube 16, before the pick-up tube is lowered into the next receptacle, so that the quantities of inhibiting agent of different concentrations are separated from each other by intervening air segments whereby there is a definite demarkation between the successive recordings of the inhibiting agent of the different concentrations, respectively.

Also, it will be understood that pursuant to the present invention, a plurality of different inhibiting agents supplied in several sets of the same or different concentrations, respectively, may be supplied to tube 16 by the supply device 30, the recessed plate 31 of said device being provided with a sufficient number of receptacles according to the assay or assays to be performed. For example, in accordance with the present invention, two or more anti-biotic substances may be assayed in respect to their respective effects on the same inoculum, and these results can be accomplished pursuant to the present invention with respect to the effects of different concentrations of the plurality of anti-biotics, for example, on such inoculum or upon a series of different inoculums added to the nutrient medium in accordance with the method herein described. Further, it will be understood that the present invention may be utilized for performing biological assays not only in respect to the effects of inhibitors, but also in respect to the effect of substances for enhancing the growth of bacterial or micro-organisms. In this latter connection, for example, the effects of various vitamins or other substances which enhance the growth of bacteria or micro-organisms can be readily ascertained by supplying the vitamin containing liquid in different concentrations to the tube 16 by the supply device 30.

The following is a non-limitative example which is illustrative of the method of performing biological assays according to the present invention, streptomycin being taken for illustrative purposes as the inhibitor. A series of known concentrations of this inhibitor, disposed in a series of the receptacles in plate 31, is supplied seriatim to tube 16, and is caused to flow through said tube by pump 10 at the rate of 1 ml. per minute. A diluent such as pure water supplied through tube 18 at the rate of 2 ml. per minute, and air is supplied through tube 22 at the rate of 0.70 ml. per minute. Concurrently, with the flow of the inhibitor, the diluent and the air, at the flow rates just specified, the nutrient is supplied through tube 12 at the rate of 3.0 ml. per minute and the inoculum is supplied through tube 14 at the rate of 1.0 ml. per minute, while air is supplied through tube 20 at the rate of 1.0 ml.

per minute. It will be understood that as the pump 10 is operated at constant speed, the indicated flow rates are automatically relatively proportional by utilizing tubes of predetermined internal diameters.

It is to be noted that in performing biological assays in accordance with the present invention, the diffusion of the growth inhibitor or growth enhancer is accomplished by flowing a stream of liquid containing the inhibitor or the enhancer, as the case may be, through one side of a dialyzer without requiring measurement of the quantity of the inhibiting or enhancing agent diffused into the inoculated nutrient medium, since the quantity of inhibiting agent which diffuses through the dialyzer membrane into the inoculated nutrient medium is proportional to the concentration of the inhibiting agent in the liquid stream containing the same, and by calibrating the recorder or the chart paper of which the records are made with respect to inhibiting agents of known concentration, the effects of various inhibitors or enhancers of different kinds and of different concentrations can be readily obtained in the performance of various biological assays by the use of the above described apparatus. It is of course understood by those skilled in the art that the optical density of the liquid containing the inocluated nutrient medium increases with the growth colony density of bacteria so that the measure of optical density of the liquid which passes through the flow cell or cuvette of the colorimeter is an indication of the effect of the inhibitor or of the enhancer on the inoculum.

The present invention may be applied to monitoring, control and other techniques as well as to strictly assay procedures. Accordingly, as used herein the term assay is not limited solely to procedures for evaluating the effect of the inhibitor or enhancer with respect to the inoculum, but also more generally to other procedures involving the treatment of an inoculum with a growth-affecting agent.

While I have illustrated and described the preferred mode of practising the present invention, it will be understood that the invention may be practised otherwise than as herein illustrated or described, and that in the illustrated and described embodiments of the invention various changes may be made and will occur to those skilled in the art, in view of the present disclosure, without departing from the underlying idea or principles of this invention within the scope of the appended claims.

Having thus described my invention, what I claim and desire to secure by Letters Patent is:

1. A method of performing biological assays, comprising forming a fluid stream containing an inoculated nutrient and a separate fluid stream containing a growth affecting agent for the inoculum in said first mentioned stream, transmitting said streams concurrently through a dialyzer at opposite sides, respectively, of the dialyzer membrane for automatically diffusing the growth affecting agent into the stream containing the inoculated nutrient in an amount proportional to the quantity of the growth affecting agent in said separate stream, incubating the resulting fluid stream containing both the inoculated nutrient and the growth affecting agent, and concurrently passing the incubated stream through a colorimeter for examination.

2. A method of performing biological assays, comprising forming a fluid stream containing an inoculated nutrient and a separate fluid stream containing a growth affecting agent for the inoculum in said first mentioned stream, and transmitting said streams concurrently through a dialyzer at opposite sides, respectively, of the dialyzer membrane for automatically diffusing the growth affecting agent into the stream containing the inoculated nutrient in an amount proportional to the quantity of the growth affecting agent in said separate stream, incubating the resulting fluid stream containing both the inoculated nutrient and the growth affecting agent, and operating a recorder under the control of said incubated stream to obtain a measurement which indicates the effect of said agent in said inoculum.

3. A method of performing biological assays, comprising introducing an inoculum into a stream of liquid containing a nutrient for the inoculum, introducing into successive segments of said stream during the flow thereof an agent for affecting the growth of the inoculum with different concentrations, respectively, of the agent in said segments, respectively, incubating said stream during the flow thereof, and examining the incubated stream during the flow thereof to determine the effect of the different concentrations of said agent on said inoculum.

4. A method of performing biological assays, comprising introducing an inoculum into a stream of liquid containing a nutrient for the inoculum, introducing into successive segments of said stream during the flow thereof growth affecting agents of different concentrations respectively, incubating said stream during the flow thereof, and operating a recorder under the control of said incubated stream to obtain measurements indicative of the effect of the agents on said inoculum.

5. A method of performing bio-assays, comprising forming a stream of fluid containing a micro-organism, introducing by dialysis into said fluid stream, during the flow thereof, a second stream of fluid containing a substance under investigation with respect to its effect on said micro-organism, incubating the resulting stream containing said micro-organism and said substance and examining said incubated stream during the flow thereof to determine the effect of said substance under investigation on said micro-organism concurrently with the flow of the first mentioned streams of fluid.

6. A method of performing bio-assays, comprising forming a stream of fluid containing a micro-organism, forming a second fluid stream containing in different flowing portions thereof a series of different substances, respectively, comprising a series of substances under investigation with respect to the effects of said last mentioned substances, respectively, on the micro-organism in said first mentioned stream, introducing successively into different flowing portions of said first stream said substances under investigation, respectively, contained in said second stream, and concurrently measuring the effect of each of said substances under investigation seriatim on the micro-organism in the different flowing portions, respectively, of said first stream.

7. A method of performing bio-assays, comprising forming a stream of fluid containing a micro-organism, introducing by dialysis into said fluid stream, during the flow thereof, a second stream of fluid containing a substance under investigation with respect to its effect on said micro-organism, and measuring the effect of said substance under investigation on said micro-organism during the flow of the stream of fluid formed by the introduction of said second stream into said first stream.

8. A method of performing bio-assays, comprising forming a stream of fluid containing a micro-organism, forming a second fluid stream containing in different flowing portions thereof a series of different substances, respectively, comprising a series of substances under investigation with respect to the effects of said last mentioned substances, respectively, on the micro-organism in said first mentioned stream, introducing by dialysis successivly into different flowing portions of said first stream said substances under investigation, respectively, contained in said second stream, and concurrently measuring the effect of each of said substances under investigation seriatim on the micro-organism in the different flowing portions, respectively, of said first stream.

References Cited in the file of this patent
UNITED STATES PATENTS

| | | |
|---|---|---|
| 668,330 | T.M. | Oct. 14, 1958 |
| 2,797,149 | Skeggs | June 25, 1957 |

(Other references on following page)

OTHER REFERENCES

United States Trademark Reg. No. 668,330, Sept. 15, 1958.

Fuld et al.: Industrial and Engineering Chemistry, August 1957, pp. 1215 to 1220.

Bartholomew et al.: I. and E. Chem., August 1957, pp. 1221–1226, POSL:TP–1–A58.

Frobisher: "Fundamentals of Microbiology," 5th edition, published by W. B. Saunders Co., Philadelphia, 1955, pp. 577–579.